Dec. 13, 1960  L. J. NOWAK, JR  2,964,283
TWIN BEAM WEIGHERS
Filed Feb. 21, 1955  6 Sheets-Sheet 1

Inventor
Leon J. Nowak, Jr.

by Parker & Carter
Attorneys

Inventor
Leon J. Nowak, Jr.

by Parker & Carter
Attorneys

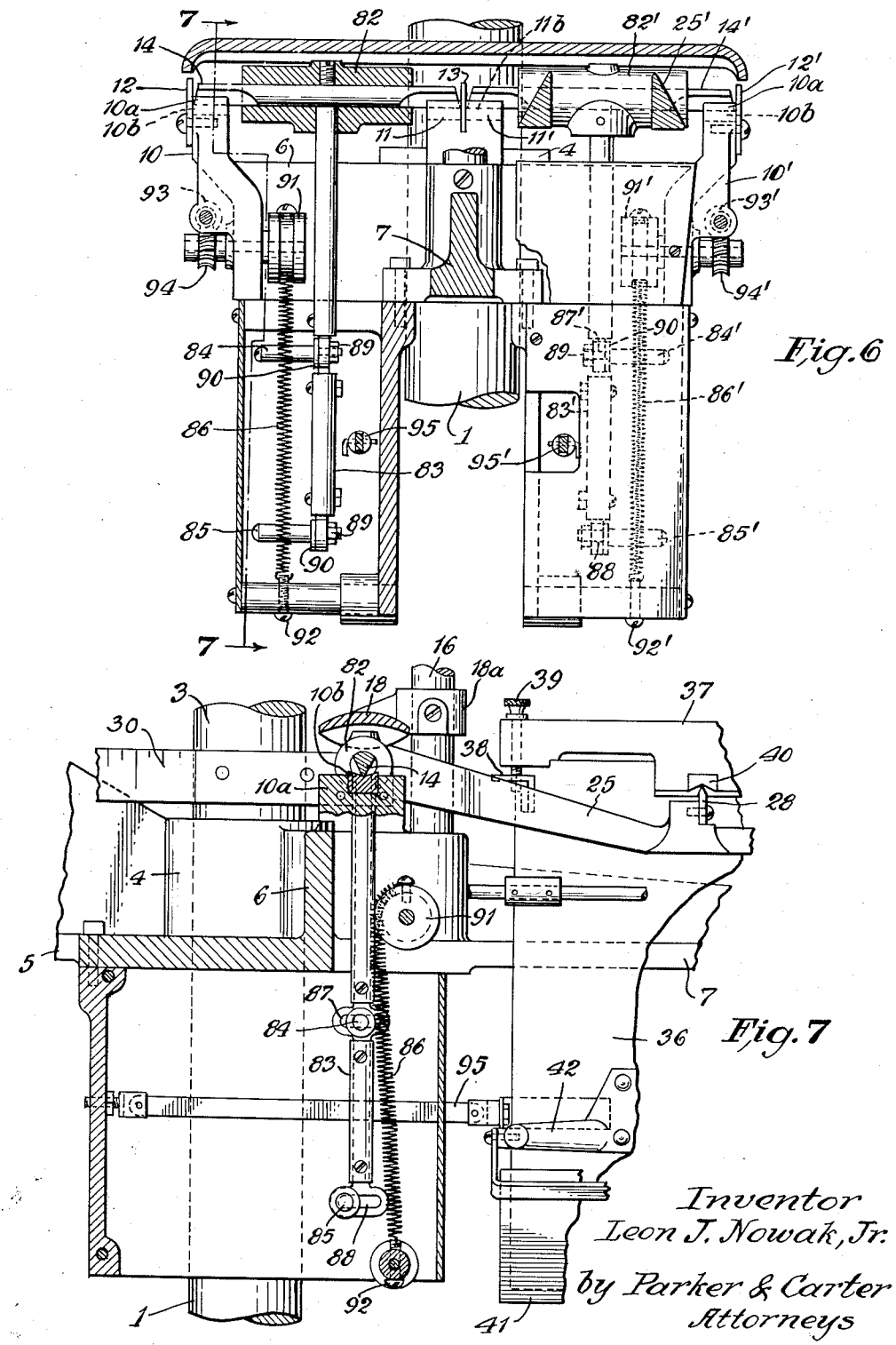

2,964,283
TWIN BEAM WEIGHERS

Leon J. Nowak, Jr., 624 S. Knight Ave., Park Ridge, Ill.

Filed Feb. 21, 1955, Ser. No. 489,358

17 Claims. (Cl. 249—26)

The present invention is directed to a new and improved form of twin beam weigher. It is particularly directed to an improvement over the weighing mechanism shown in my Patent 2,669,412, issued February 16, 1954.

One purpose of the present invention is the provision of a novel system for controlling and terminating the feeding of material into a receiving container associated with weighing apparatus.

Another purpose of the present invention is the provision of a novel chute for a weighing apparatus wherein the chute is so formed as to prevent binding or bridging of particles flowing through the chute and insure uniform delivery therefrom.

Another purpose is the provision of a novel twin beam weighing apparatus wherein the relative proportions of material fed into two receptacles in the weighing apparatus is varied by varying the angle of discharge of the material stream with respect to the receptacles.

Another purpose is the provision of a novel deflector which is associated with a pair of receptacles for dividing a stream of material into two streams delivered to each of the two receptacles.

Other purposes will appear from time to time in the course of the ensuing specification and claims.

Referring generally now to the drawings:

Figure 6 is a view on an enlarged scale taken substantially along the line 6—6 of Figure 1; and Figure 7 is a vertical section on an enlarged scale taken along the section lines 7—7 of Figure 6.

Like elements are designated by like characters throughout the specification and drawings.

Figure 1:
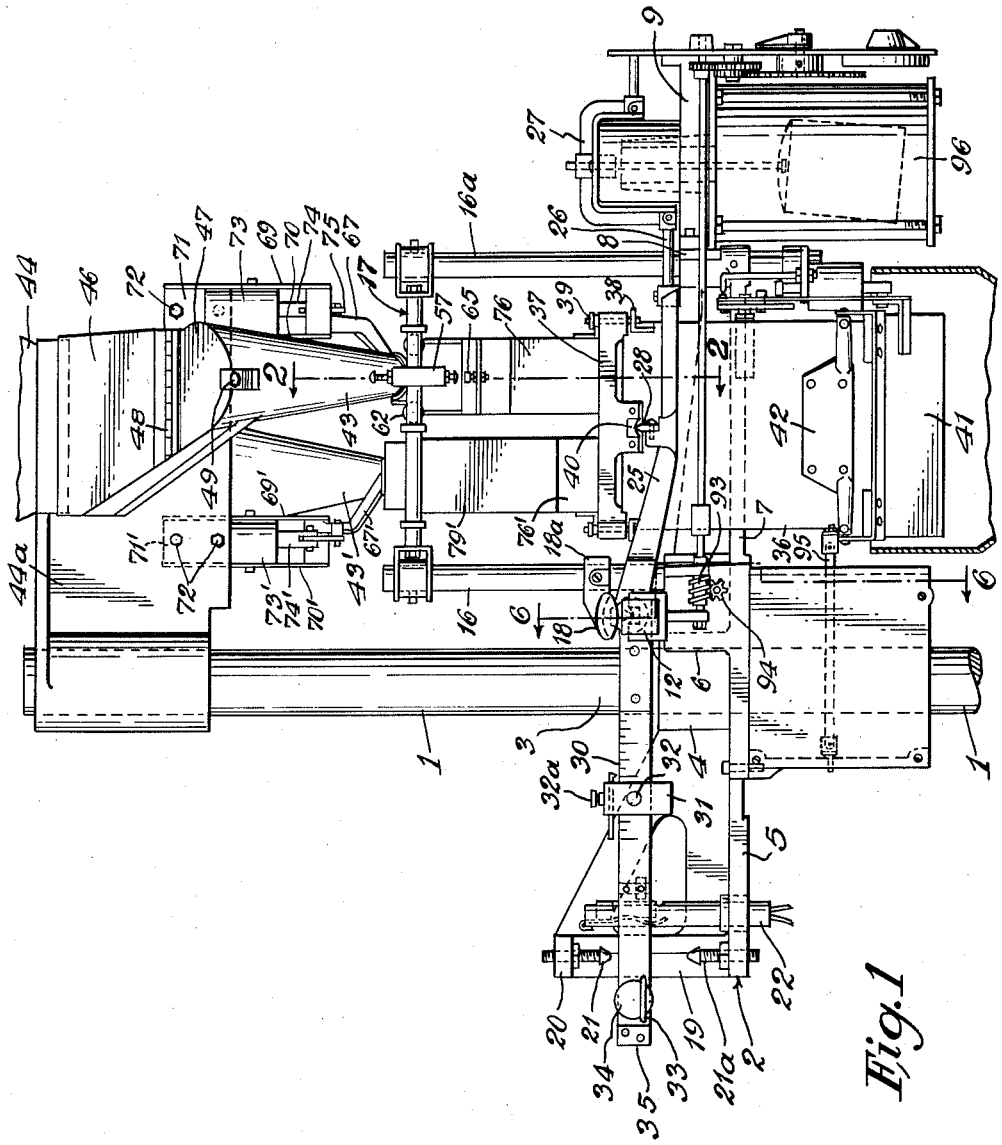
Figure 1 is a side elevation.

Referring to the drawings, I illustrate a typical twin beam weighing structure with which my invention is associated. I illustrate, for example, any suitable support 1, herein shown as a generally vertical post, mounted on any suitable base, not shown herein. 2 generally indicates a generally horizontally extending main frame structure which may be secured to the support 1 by any suitable means. For example, an intermediate portion 3 of the support 1 may pass through a reinforcing sleeve 4 connected to a medial portion 5 of the main frame. Extending laterally, or to the right as seen in Figure 1, from intermediate vertical member 6 I illustrate a horizontal extension of the main frame, generally indicated at 7 terminating in a member 8. A top plate 9 may be secured to the member 8 for a purpose which will later appear. Side members 10 and 10' may extend on opposite sides of the support 1 and include upward projections 10a adapted to receive scale blocks or scale bearings 10b. Central projections 11 and 11' extend upwardly from the main frame in general alignment with the side members 10. The members 11 and 11' carry upwardly concave scale bearing blocks 11b similar to bearings 10b. Limit plates 12, 12', and 13 limit the inward and outward movement of weighing beam pivot bars 14 and 14', best seen in Figures 6 and 7 respectively with respect to the support 1.

The main frame serves to support upwardly extending supporting rods 16 and 16a which support at their upper ends a generally rectangular subframe 17. A cover plate 18 may be secured to the rod 16 as by a collar 18a to overlie and cover the scale pivot structure.

A support 19 is integral with the main frame 2 and extends upwardly from the left hand side of the main frame 2 as shown in Figure 1. The support 19 is positioned between a pair of scale beam structures mounted on the pivot bars 14 and 14' and includes cross-bar 20 carrying adjustable stops 21 to thereby limit the upward movement of the extension 30 of the weighing beam pivot bars 14 and 14'. Adjustable stops 21a may be carried by the left hand end of the main frame as shown in Figure 1 to thereby limit the downward movement of the extension 30 of the weighing beam pivot bars 14 and 14'. A switch 22, which is shown as a magnetic, mercury type switch is positioned adjacent the extension 30. The switch 22 is ad pted to be closed whenever the extension 30 rises to a predetermined position which may be for example, a generally horizontal position as represented by the position of bar 30 in Figure 7.

Each of the beam structures is identical. Each may include for example, a loop 25 or 25' extending in one direction from the pivot bar 14 or 14', as to the right in Figure 7. A bar extension 26 is secured to the loop 25 or 25' and it includes an upwardly bent portion 27. Each loop is adapted to surround and support a material-receiving receptacle. Opposite sides of the loop 25 or 25' may carry upwardly convex pivot bearings or knives 28 or 28'. Extending in the opposite direction from the pivot bar 14 is an extension 30 which slidably carries an adjusting weight 31 which may be set by the operator before initiating operation of the device. When set, it may be locked in position, for example by the set screw 32. A pointer associated with the weight 31 may be adjusted and locked by a set screw 32a. Secured to the outer end of the extension 30 is a U-shaped element 33 adapted to receive any suitable removable weights 34 for the adjustment of the device. 35 generally indicates any suitable terminal weight structure or counter-balance. In adjusting the device members 34 may be added or removed and a finer, delicate adjustment may be made by moving the weight 31 and setting it in the desired position along the calibration indicated at Figure 1 on the extension 30.

Material-receiving buckets or receptacles 36 and 36' are suspended within the loops 25 and 25'. Each bucket is associated with a top bucket support 37 or 37' to which the bucket is secured by ears 38, and screws 39 as illustrated in conjunction with receptacle 36. Each top support 37 or 37' carries downwardly concave bearings 40 or 40' opposed to the bearing knives 28 or 28' of the loops 25 and 25'.

Each bucket may include a bottom gate 41 pivoted to a fitting 42. Although not shown in the drawings any suitable means may be provided for opening the gate on each bucket so as to open the gate and empty the receptacle or bucket in a predetermined timed relation to the filling of the receptacle.

The twin beam weighing apparatus described thus far should be taken as typical of or representative of a twin beam weighing apparatus.

Figure 2:
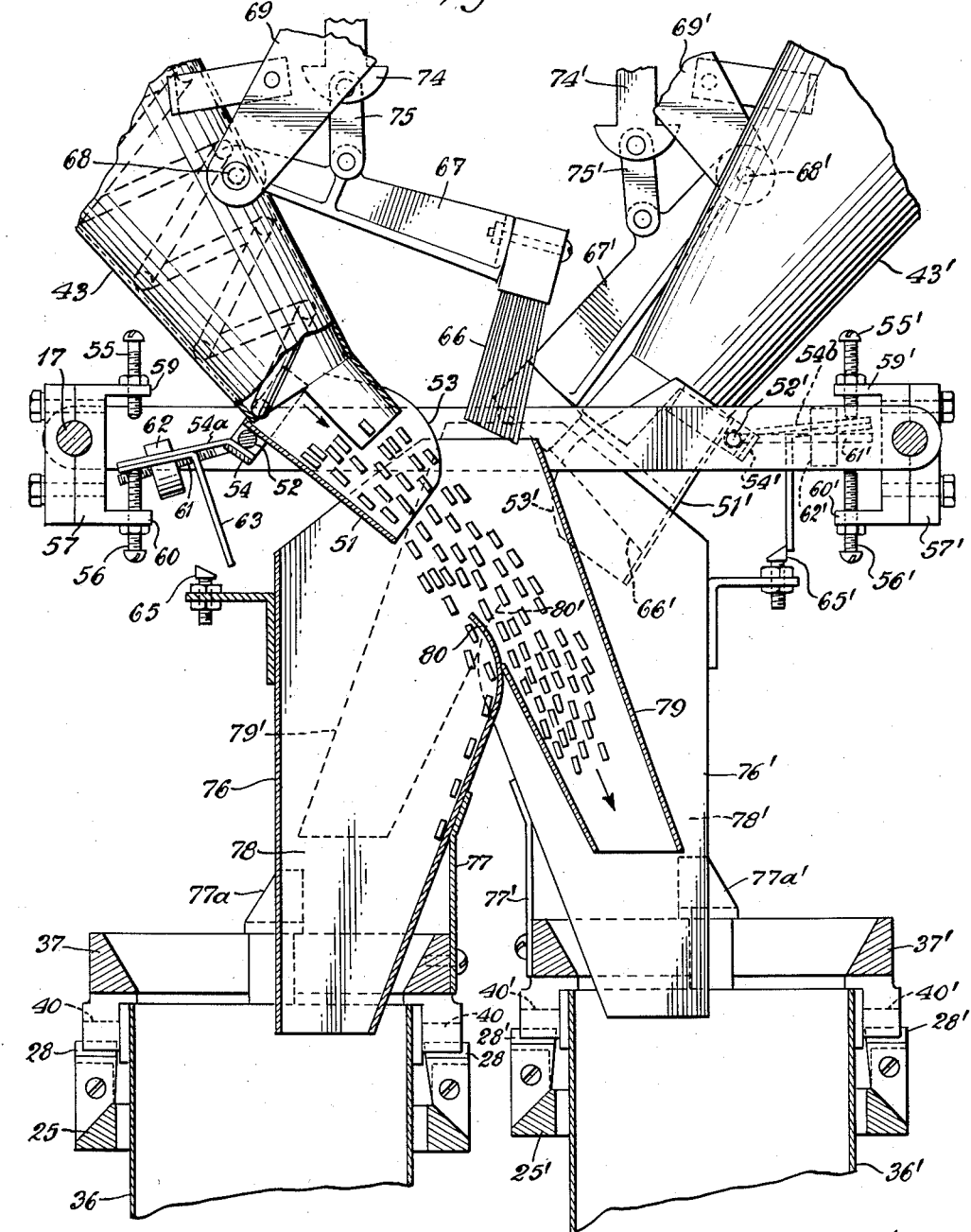
Figure 2 is a vertical section on an enlarged scale on the line 2—2 of Figure 1.

I employ a pair of chutes 43 and 43' for delivering a stream of material towards each of the receptacles 36 and 36', respectively, from any suitable hopper 44 which is shown diagrammatically in Figure 1. The hopper 44 is secured to the support 1 as by means of frame member 44a. As illustrated in Figure 2, a chute is positioned above each of the receptacles with its axis generally aligned with the upper part of the other receptacle.

Figure 3:
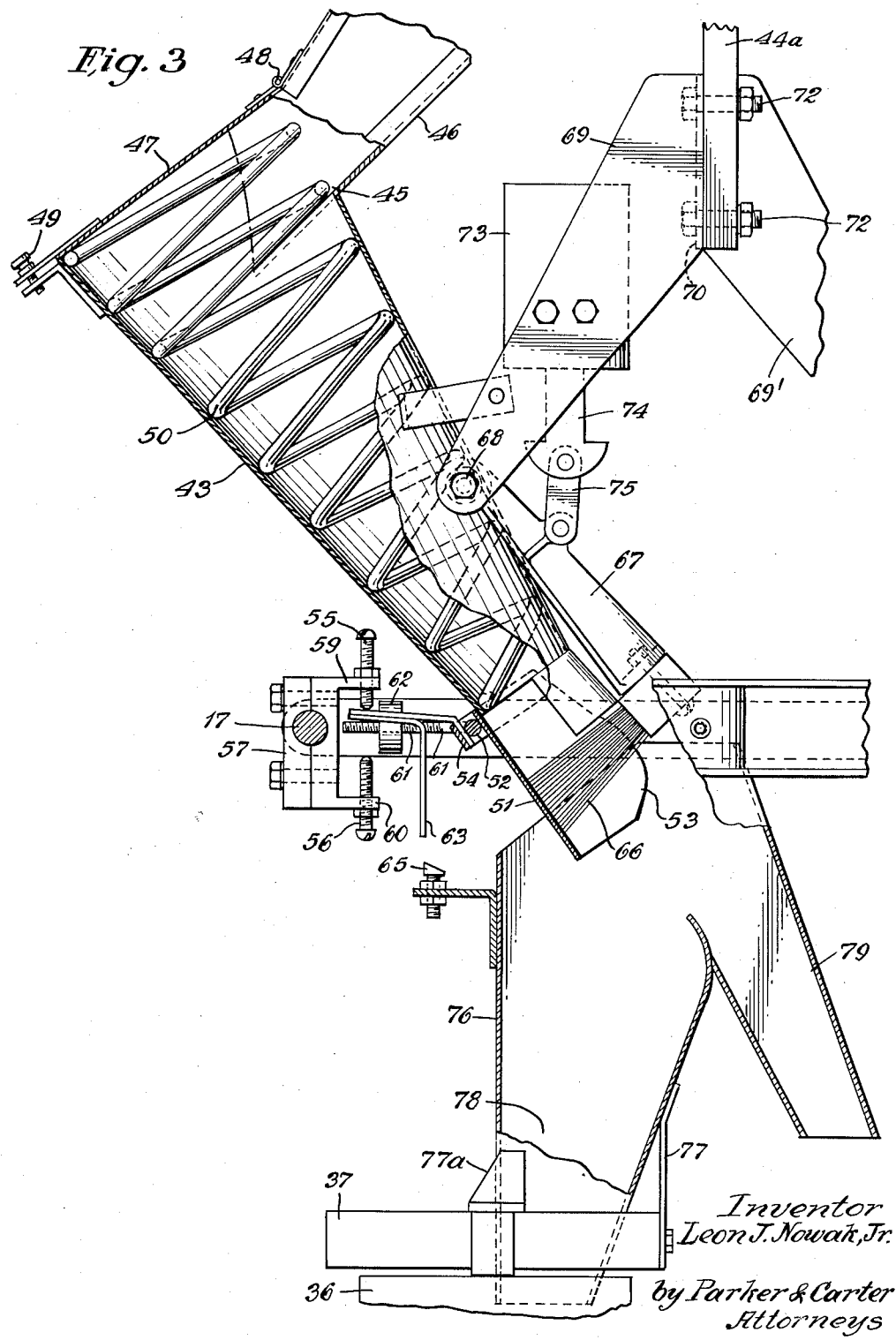
Figure 3 is a sectional view of certain elements shown in Figure 2 but illustrating another operative position of certain elements shown in Figure 2.

Each of the chutes as illustrated in Figure 3 includes an inlet 45 which communicates with a conduit 46 formed integrally with the chute and leading to the hopper 44. The upper end of each chute includes a closure 47 which may be hingedly mounted on the conduit 46 as at 48 and secured in closed position by any suitable latching device 49. It should be noted that each chute has a gradually decreasing diameter from the upper end thereof to the lower end thereof. The lower or outlet end of each chute 43 is positioned generally above one of the receptacles 36 or 36'. The chute is inclined, however, so that its axis is directed generally towards the other receptacle. When material is fed downwardly through the chute it is directed towards that receptacle which is laterally away from the lower end of the chute.

In feeding material to the receptacles, I find it particularly advantageous to position a coiled spring or rod 50 throughout the length of the chute. The coils of the rod may be fixed to the inner wall of the chute by any suitable means such as welding or the like so as to form a spiral projecting inwardly from the inner walls of the chute. The rod has a varying pitch throughout the length thereof. The pitch progressively increases from the upper or inlet end of the chute to the lower or outlet end of the chute and it is varied in a manner such that the product of the diameter or cross-sectional area at any particular point in the length of the chute and the pitch of the spring at that point is generally a constant value. The particular arrangement shown minimizes a pulsating tendency of the stream of material delivered through the chute.

The lower end of each chute has an adjustable deflecting member 51, 51' pivotally mounted thereon as at 52, 52'. Although many constructions of the deflecting member are possible, a gate or plate has been illustrated in the embodiment shown in the drawing. The plate 51 or 51' may include laterally spaced, wing portions 53 or 53', defining a trough therethrough. An arm 54a and 54b is secured to the bearing structure 54 or 54', respectively, surrounding the pivot pin 52 and 53'. The arm 53 moves with the movement of the plate 51 and it extends between opposed adjustable stops 55 and 56 or 55' and 56', carried by a generally U-shaped split sleeve 57 or 57' respectively. The sleeves 57, 57', may be mounted on the rod 17.

Figure 4:
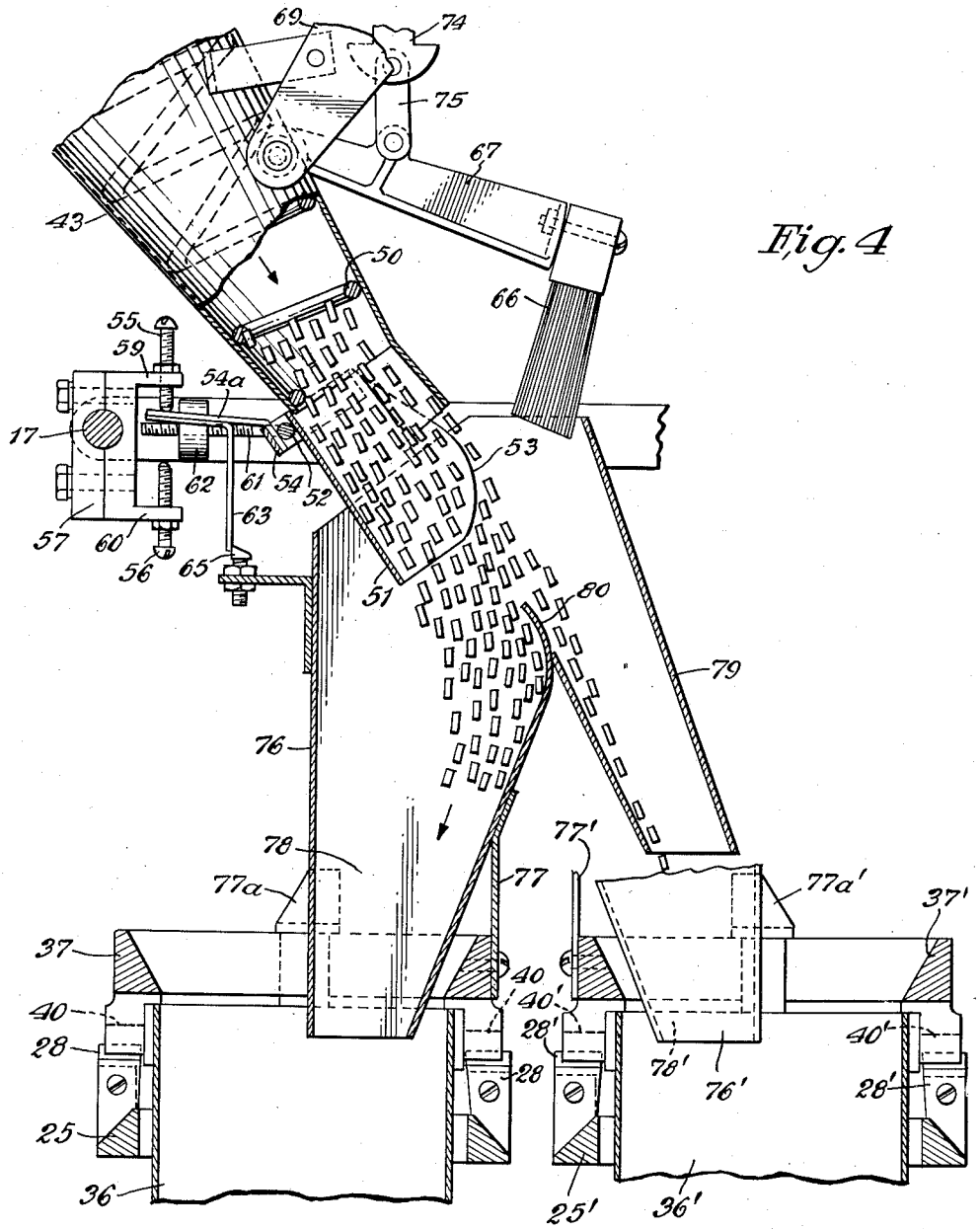
Figure 4 is a view similar to Figures 2 and 3 but illustrating still another operative position of certain elements shown in Figure 2.
Figure 5:
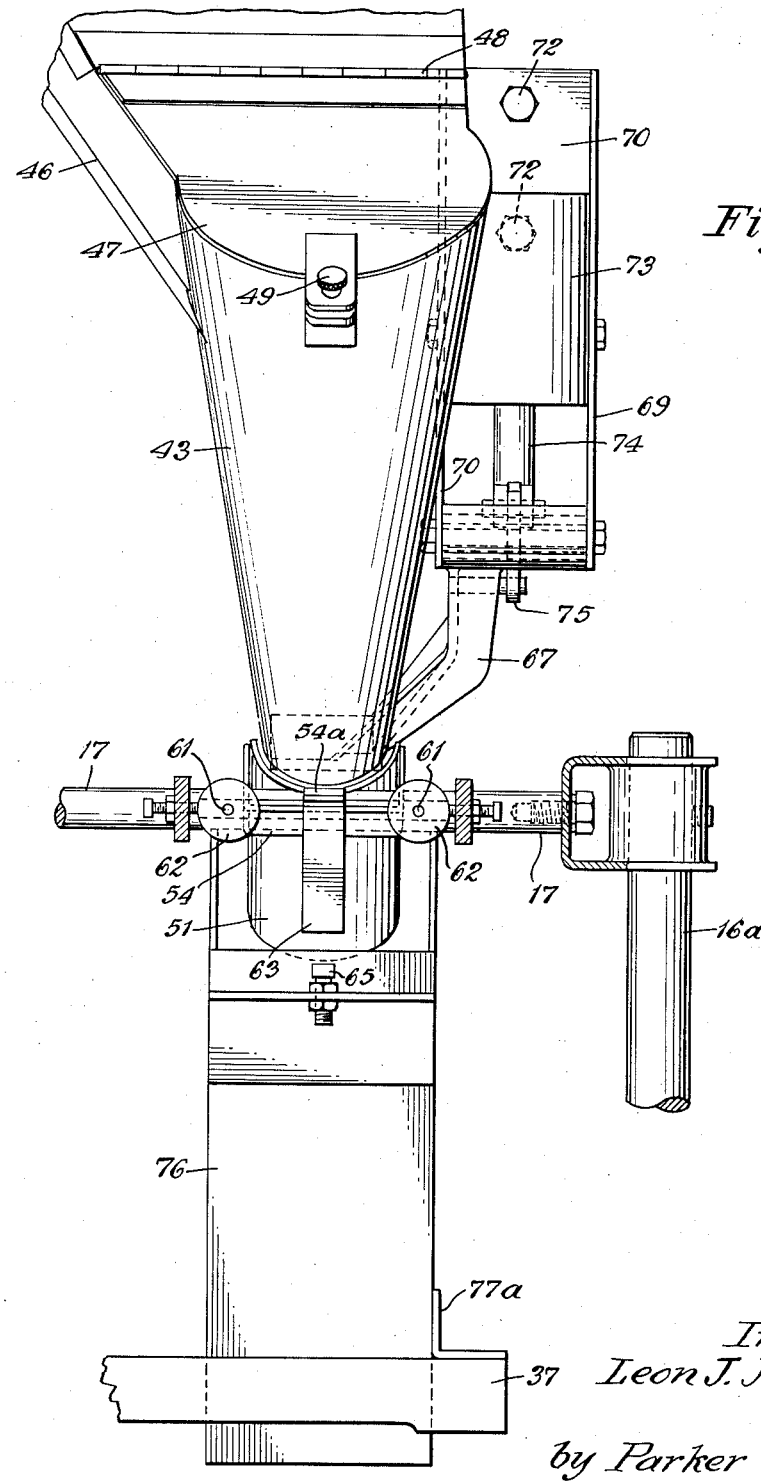
Figure 5 is an enlarged detailed view of certain elements shown in Figure 1.

The stops 55, 55' and 56, 56' may take the form of adjustable bolts which are screw-threaded through opposed legs 59 and 60 or 59' and 60' of the sleeve 57 or 57' respectively. Rods 61, 61' may be fixed to the bearing 54 and have an adjustable weight 62, 62' threaded thereon. These weights bias the plates 51 or 51' toward the position indicated by Figure 2 wherein the plate 51 is positioned at an angle to the axis of the chute. This has the effect of varying the discharge angle of the stream of material delivered through the chute 43 or 43'. The upper stop 55 or 55' may be adjusted to a position wherein the plate, at one limit of movement, is generally parallel to the axis of the chute 43 as shown in Figure 3. The arm 54a has a downwardly extending latching element 63 which is positioned generally intermediate the ends of the arm 61. Latching element 63 is adapted to be held in a position wherein the plate 51 is as shown in Figures 3 and 4 by a cooperating latching abutment 65 for a purpose which will appear.

A closure in the form of a brush 66, 66' is adapted to be moved between an open position, illustrated in Figure 2 and a closed position illustrated in Figure 3. The brush 66 or 66' is snugly received between the wings or side plates 53 or 53', respectively, in the closed position. The brushes are carried on arms 67 and 67' which in turn are pivotally mounted on pivot pins 68 and 68', respectively. The pivot pins may be supported by spaced, depending frame elements 69 and 70 or 69' and 70' having flanges 71 or 71' for attachment to the frame member 44a. Bolts or the like 72 may be employed to fix the frame elements in the position illustrated in Figures 2 and 3.

The respective closures for the chutes 43 and 43' are adapted to be moved between their open and closed positions by means of extensible actuators 73 and 73', respectively. The actuators 73 and 73' may take the form of solenoids having plungers 74 and 74' interconnected with the arm 67 and 67', respectively, through links 75 and 75'. Retraction of the plungers moves the closures to the upper or open position illustrated in Figure 2, whereas extension of the plungers moves the closures to the closed position as illustrated in Figure 3 or as illustrated by the right hand closure in Figure 2. Under some circumstances it may be desirable to use an air-motor or hydraulic ram for moving the closures between their open and closed positions. Movement of the closures to the closed position positively forces the plates 51 or 51' associated with the particular closure to the position indicated in Figure 3 against the bias of the weights 62 or 62'. When the closures are moved to their open position as indicated in Figure 2 by the closure 66, the weight 62 is effective to swing the plate 51 about the pivot 52 so as to deflect the stream of material passing through the chute 43 in an upward direction. Such movement of the plates 51 or 51' is, at certain times in the weighing cycle limited by the latching elements 63 and 65 or 63' and 65' as illustrated in Figure 4.

An auxiliary chute 76 and 76', respectively, is carried by each of the receptacles 36 and 36', respectively. As will be seen in Figure 1, the auxiliary chutes 76 and 76' are positioned side by side with each chute in generally vertical alignment with its associated chute 43 and 43', respectively. The chute 76 is supported on its receptacle 36 as by means of upstanding members 77 and 77a whereas the chute 76' is supported on the receptacle 36' as by means of an upstanding member 77' and 77a'. Each of these material intercepting chutes includes a first passageway 78 and 78', respectively, in general vertical alignment with its supporting receptacle and the deflecting members 51 and 51', respectively, above the supporting receptacle. Each of the auxiliary chutes 76 and 76' includes a branch pipe 79 and 79', respectively, which extend from the upper end of the chute to a point positioned above the receptacle supporting the other chute.

It should be noted in Figures 2, 3, and 4 that the upper ends of each of the auxiliary chutes 76 and 76', extend to a point above the lowermost portion of the deflecting members 51 and 51'.

Each of the chutes 76 and 76', includes a deflector 80 and 80', respectively, which is formed at the junction of the passageways 78 and 78' and branch pipes 79 and 79', respectively. The deflector 80 and 80', as shown in Figures 2 through 4 inclusive, are generally curvilinear and they extend toward the outlet end of the chute 43 and 43', respectively, positioned above the receptacles 36 and 36'. The deflectors 80 and 80', are so positioned that when the receptacles 36 and 36' are in their uppermost position, and when the deflecting plates 51 and 51' are in their lowermost position, the majority of material delivered through the chute 43 or 43', as the case may be, is intercepted by the deflectors 80 or 80' and directed towards its supporting receptacle as illustrated in Figure 4. As the receptacle moves downwardly, however, in response to the weight of the material in the receptacles, the deflector associated with the downwardly moving receptacle, will be gradually moved downwardly so as to intercept less and less of the material delivered from the chute 43 or 43'.

I find it advantageous to employ resilient means for biasing the pivot bars 14 and 14' in a receptacle-lowering direction as in the case of my Patent No. 2,669,412. In the present invention, however, I employ two distinct stages of biasing forces exerted during the downward movement of the receptacles in response to the deposit of material in the receptacles. In the aforementioned patent, the resilient biasing force merely decreases progressively as the receptacle moves progressively downwardly.

As shown in Figures 6 and 7, for example, I include sleeves 82 and 82' which are fixed to the pivot bars 14 and 14', respectively to support rods 83 and 83'. The rods depend from the sleeves and carry spaced abutments 84, 84' and 85, 85', respectively. The abutments are adapted for engagement with coiled springs 86 and 86' when the receptacle associated with the particular spring and rod is at its uppermost position. When the receptacle is at its lowermost position or in the weighing position, as for example when the member 29 is generally horizontal, the abutments 84 and 85 or 84' and 85' are out of engagement with the spring 86 so that the final weighing operation is independent of the spring 86. The abutments may take the form of rods adjustably positioned in spaced slots 87, 87', 88 and 88', respectively. Nuts 89 may be employed to pull the washers 90 carried by the rods, tightly against the slots 87 and 88 and thereby secure the abutments at a desired position within the slots.

The spring 86 is supported at its upper end by a pulley 91 which is mounted for rotation on the member 15 or 15' as the case may be. The lower end of the spring is held in position by any suitable connection such as a bolt 92 and 92', respectively. The tension on the spring 86 may be adjusted by rotating the pulley 91 or 91' as by means of a worm 93 and worm-wheel 94 for the pulley 91 and worm 93' and worm-wheel 94' for the pulley 91'.

The abutments 84 and 85 or 84' and 85', are adjusted so that when the receptacle associated therewith is in its uppermost position both the abutment 84 and the abutment 85 are in engagement with the spring 86 intermediate the ends of the spring. This results in a relatively large biasing force. As the receptacle moves downwardly a predetermined amount, however, the rod 83 or 83' as the case may be, is rotated and the lower abutment or the abutment furthest from the pivot 14 moves out of engagement with the spring 86 leaving only the abutment 84 in engagement with the spring 86. This results in a different stage of biasing pressure. It is a lower pressure due to the fact that the abutment 84 is closer to the pivot 14 and the effective turning moment on the pivot 14 is much lower. When the receptacle moves further downwardly the rod 83 is gradually rotated to a position wherein the upper abutment 84 is out of engagement with the spring 86. Thus the final weighing operation is independent of the spring 86.

I may employ any suitable guiding means 95 and 95' respectively, as in the case of my aforementioned patent, to insure generally vertical reciprocation of the receptacles 36 and 36' respectively. I may also include a dash-pot structure indicated generally at 96 for preventing sudden movements of the receptacles 36 and 36'. The dash-pot structure shown in Figure 1 is similar in all respects to that employed in my aforementioned patent.

Although I do not illustrate it in the drawings, I wish it to be understood that the present invention is adapted to be controlled by a circuit such as is illustrated in my Patent No. 2,669,412. As is the case with the control circuit illustrated there, the solenoids or other equivalent actuators 73 and 73' are actuated so as to open one of the closures 66 or 66' when the opposite receptacle has been dumped. The solenoids or other actuators 73 or 73', are actuated so as to move the closures to the closed position whenever the receptacle associated with the particular chute and closure (below that chute) has been filled, which moves the extension bar 30 to the predetermined weighing position (as for example, the horizontal position) thus closing the switch 22.

Whereas, I have shown and described an operative form of my invention, I wish it to be understood that this showing is to be taken in an illustrative or diagrammatic sense only. There are many modifications to my invention which will be apparent to those skilled in the art and which will fall within the scope and spirit of my invention. The scope of the invention therefore, should be limited only by the scope of the hereinafter appended claims.

The use and operation of my invention are as follows:

I employ a pair of material delivery chutes 43 and 43' which deliver a stream of material toward a pair of receptacles 36 and 36' respectively. The chute 43 delivers material towards the receptacle 36', whereas the chute 43' directs material towards the receptacle 36. Each of the receptacles 36 and 36' is carried by a weight responsive support as is found in the loop 25, pivot bar 14, and extension 30 for the receptacle 36.

A deflector 80 or 80' is associated with each of the receptacles 36 and 36' respectively, so as to intercept the stream of material directed toward the opposite receptacle and direct the material intercepted into the receptacle associated with the particular deflector.

When one receptacle is empty it is at its uppermost position as illustrated in Figure 4. In Figure 4, it should be noted that both receptacles are illustrated in the empty, uppermost position. At this position, the latching elements 65 and 63 are in engagement with one another thereby holding the deflecting plate 51 in general parallelism with the axis of the chute 43. When the closure 66 is moved to the open position as illustrated in Figure 2 or Figure 4, the deflector 80 intercepts the majority of material delivered toward the receptacle 36' and the material intercepted moves downwardly through the first discharge portion defined by the passageway 78 into the receptacle 36. A small proportion of the material may flow over the upper surface of the deflector 80 and down the second discharge portion defined by branch 79 into the receptacle 36'. Thus, during the initial stage of the weighing operation a comparatively large amount of the flowing material is delivered to the receptacle 36. The receptacle, however, is under the combined influence of the weight of material in the receptacle and the spring 86 so that when a predetermined amount of material is in the receptacle, the receptacle will move downwardly a slight amount, thereby bringing the latching element 65 out of engagement with the latching element 63. This is illustrated in Figure 2. The weights 62 are then effective to move the deflecting plate 51 in an upward direction thereby changing the angle of discharge of the material stream flowing through the chute 43.

When the deflecting plate 51 has been moved to the position indicated in Figure 2, the majority of material will be delivered through the branch pipe 79 into the other receptacle 36'. The deflector 80, however, is still intercepting material from the material stream so as to provide a dribble finish to the material delivered to the receptacle 36. At this time the resilient pressure exerted by the spring 86 is comparatively small and the receptacle 36 will be moving downwardly in response to the build-up of the weight of material in the receptacle. As the receptacle moves downwardly towards the final or weighing position the deflector 80 is gradually withdrawn from the material stream so as to provide what is in effect a final diminution of the material delivered to the receptacle 36. When the receptacle 36 is moved downwardly sufficiently to move the extension bar 30 to the weighing position, the deflector 80 is withdrawn altogether from the material stream. At this point the switch 22 is closed and the closure 66 moves into engagement with the deflecting plate 51, moving it to the position indicated in Figure 3 while closing the outlet of the chute 43.

When the closure 66 has moved to its closed position, the receptacle 36 is dumped as by opening the bottom closure 41 therefore, and upon emptying the receptacle 36, the actuator 73' is operated so as to move the closure 66' to the open position thus allowing the stream of material from the chute 43' to be directed toward the receptacle 36'. The cycle just described for the receptacle 36 is repeated with the receptacle 36' until the receptacle 36' has been filled and emptied at which time the stream of material is again delivered through the chute 43.

I find it particularly advantageous to employ the form of material delivery chutes illustrated in Figure 3. The inwardly extending spiral projection defined by the spring 50 imparts a generally spiral path to material flowing downwardly to the chute 43 and bridging of the material in the chute is prevented while a generally uniform discharge of material into the receptacles is assured.

I claim:

1. In an automatic weigher, a pair of weight responsive supports, a material receiving receptacle for each said weight responsive support, means for delivering a stream of material alternately toward each receptacle, an individual deflector adjacent each receptacle, means for controllably positioning the deflector of one receptacle in the stream of material directed toward the opposite receptacle, means for discharging the weighed material, and means for adjusting the angle of the stream of material directed toward each receptacle in coordination with the degree of fill of the receptacle, said adjusting means being upstream from the point of contact of the deflector with the material stream.

2. In an automatic weigher, a pair of weight responsive supports, a material receiving receptacle for each said weight responsive support, means for delivering a stream of material alternately toward each receptacle, an individual deflector adjacent each receptacle, means for controllably positioning the deflector of one receptacle in the stream of material directed toward the opposite receptacle, means for discharging the weighed material, means for adjusting the angle of the stream of material directed toward each receptacle in response to a predetermined filling of the other receptacle, and means for progressively withdrawing the deflector of each receptacle from the stream of material directed toward the other receptacle after adjustment of said stream angle, said stream angle remaining generally constant during said progressive withdrawal of the deflector.

3. The structure of claim 1 including a chute for delivering a stream of material toward each receptacle and further characterized in that said adjusting means includes a deflecting member positioned adjacent the discharge end of said chute and movable into and out of the stream of material delivered by said chute.

4. The structure of claim 1 characterized in that each said deflector is movable unitarily with one of said receptacles.

5. The structure of claim 1 characterized by and including a material delivery chute positioned generally above each said receptacle and having its axis directed toward the other receptacle, each of said receptacles having one of said deflectors associated therewith and immovable relative thereto, each of said deflectors being movable in response to movement of its associated receptacle into and out of the stream of material delivered by said chute toward the other receptacle.

6. In an automatic weigher, a weight responsive support and a material receiving receptacle mounted on said support, means for delivering a stream of material above said receptacle along an axis directed away from said receptacle, means cooperating with said receptacle for intercepting material in said stream and delivering the material intercepted towards said receptacle, a scale beam cooperating with said receptacle and movable in response to movement of said receptacle upon the delivery of material to said receptacle, resilient means for biasing said scale beam in a direction tending to move said receptacle downwardly, said means providing two distinct stages of biasing force and means for changing the biasing force exerted on said scale beam from a higher stage to a lower stage of force in response to a predetermined initial downward movement of said receptacle.

7. In an automatic weigher, a weight responsive support and a material receiving receptacle for said support, means for delivering a stream of material above said receptacle along an axis directed away from said receptacle, means cooperating with said receptacle for intercepting material in said stream and delivering the material intercepted toward said receptacle, a scale beam movable in response to movement of said receptacle upon the delivery of material to said receptacle, resilient means for biasing said scale beam in a direction tending to move said receptacle downwardly, means for instantaneously changing the biasing force exerted on said scale beam by said resilient means from a predetermined biasing force to a distinctly lower force in response to a predetermined initial downward movement of said receptacle, said resilient means being ineffective when said scale beam has moved to a predetermined position.

8. The structure of claim 7 wherein said resilient means includes a lever movable with said scale beam and a spring engaged by spaced abutments on said lever, one of said abutments being movable out of engagement with said spring in response to a predetermined movement of said scale beam, movement of said scale beam to a position of balance with respect to said receptacle being effective to move each of said abutments out of engagement with said spring.

9. The structure of claim 8 characterized by and including means for adjusting the angle of the material stream with respect to said receptacle in response to movement of said one abutment out of engagement with said spring.

10. In an automatic weighing mechanism, a weight responsive support and a receptacle cooperating with said support, means for discharging a stream of material above said receptacle and in a direction away from said receptacle, a deflector movable with said receptacle and positionable in and out of the discharging stream, said deflector being effective to intercept the material in said stream and deliver said material to said receptacle, and means independent of said deflector for moving the axis of said stream away from said deflector in response to a predetermined weight of material in said receptacle while leaving said deflector in intercepting relation to a portion of said stream.

11. The structure of claim 10 characterized by and including a movable guide for moving the axis of said stream, said guide being movable in response to a predetermined weight of material in said receptacle.

12. The structure of claim 10 characterized by and including a material delivery chute positioned above the receptacle and a movable gate cooperating with the discharge end of said chute, said gate being movable into and out of the stream of material delivered by said chute.

13. In an automatic weighing mechanism, a weight responsive support and a receptacle cooperating with said support, means for discharging a stream of material above said receptacle and in a direction away from said receptacle, a chute having a first discharge portion positioned above said receptacle and a second discharge portion positioned away from said receptacle, said chute including a deflector extending toward said means, said deflector including an upper surface for guiding material from said stream to said second discharge portion and a lower surface for guiding material from said stream through said first portion into said receptacle, said deflector and chute being movable with said receptacle, said deflector being normally effective to intercept the material flowing in said stream and deliver said material to said receptacle, downward movement of said receptacle and said deflector effecting a gradual withdrawal of the deflector from the material stream and thereby progressively diminishing the material delivered to said receptacle.

14. In an automatic weighing mechanism, a pair of weight responsive supports and a material receiving receptacle cooperating with each said weight responsive support, a material delivery chute positioned above each said receptacle with the axis thereof disposed toward the other receptacle, an auxiliary chute associated with each receptacle and having a first conduit for discharging material into its associated receptable and a second conduit for delivering material into the other receptacle, said conduits merging in a deflector extending toward the chute above the associated receptacle, each of said deflectors being effective to intercept the material in said stream and deliver said material to its associated receptacle, downward movement of said receptacle and deflector being effective to gradually withdraw said deflector from the discharging stream, and means for moving the material flowing from each chute away from said deflector in response to a predetermined weight of material in the receptacle undergoing filling.

15. An automatic weighing mechanism as set forth in claim 14 wherein said last named means includes a deflecting member positioned adjacent the discharge end of said chute and biased toward a position deflecting the majority of material above the deflector associated therewith, and latch means operative to hold said deflecting member away from said position.

16. The structure of claim 15, wherein said latch means are disengaged in response to a predetermined weight of material in the receptacle undergoing filling.

17. An automatic weighing mechanism as set forth in claim 16 wherein a brush closure is movable into and out of abutting relation with said deflecting member and effective during movement thereof to close the discharge end of the chute while forcing said deflecting member away from said position.

References Cited in the file of this patent

UNITED STATES PATENTS

| | | |
|---|---|---|
| 287,033 | Lewis | Oct. 23, 1883 |
| 488,101 | Washington | Dec. 13, 1892 |
| 934,420 | Weyant | Sept. 4, 1909 |
| 1,417,780 | Stephens | May 30, 1922 |
| 1,881,003 | Wallace | Oct. 4, 1932 |
| 2,624,538 | Schrock et al. | Jan. 6, 1953 |
| 2,669,412 | Nowak | Feb. 15, 1954 |